US007341772B2

(12) United States Patent
Guess

(10) Patent No.: US 7,341,772 B2
(45) Date of Patent: Mar. 11, 2008

(54) CARPET USING UNUSED YARN

(75) Inventor: Roy E. Guess, Jasper, GA (US)

(73) Assignee: Mannington Mills, Inc., Salem, NJ (US)

( * ) Notice: Subject to any disclaimer, the term of this patent is extended or adjusted under 35 U.S.C. 154(b) by 787 days.

(21) Appl. No.: 10/782,631

(22) Filed: Feb. 19, 2004

(65) Prior Publication Data

US 2004/0185219 A1 Sep. 23, 2004

Related U.S. Application Data

(60) Provisional application No. 60/454,553, filed on Mar. 14, 2003.

(51) Int. Cl.
*B32B 33/00* (2006.01)
*B32B 3/14* (2006.01)

(52) U.S. Cl. ............................ 428/89; 428/97; 428/48; 428/88

(58) Field of Classification Search .................. 428/89, 428/97, 48, 88
See application file for complete search history.

(56) References Cited

U.S. PATENT DOCUMENTS 4,000,707 A 1/1977 Spirer ........................ 112/410
4,077,343 A 3/1978 Hawkins ...................... 112/410
2002/0136855 A1 9/2002 Daniel et al. ................. 428/44
2003/0031821 A1 2/2003 Oakey et al. ................. 428/44

FOREIGN PATENT DOCUMENTS

WO WO 02/090103 A2 11/2002
WO WO 03103944 A1 * 12/2003

OTHER PUBLICATIONS

Product Information from Web page, on "Stripe Tease," by Fortune Contract, 2003 (9 pages).
International Search Report for PCT/US2004/007814 dated Aug. 9, 2004.
International Preliminary Report on Patentability and Written Opinion for PCT/US2004/007814 dated Sep. 29, 2005.

* cited by examiner

*Primary Examiner*—Cheryl Juska
(74) *Attorney, Agent, or Firm*—Kilyk & Bowersox, P.L.L.C.

(57) ABSTRACT

A carpet is described which has a particular yarn pattern which permits the use of different types of yarn such as unused yarn to form a carpet having a visually consistent appearance from manufacturing run to manufacturing run even though different types of yarns may be present. Other aspects of the invention are also described.

29 Claims, 8 Drawing Sheets
(1 of 8 Drawing Sheet(s) Filed in Color)

MUNSELL HUE CIRCLE WITH VALUE SCALE

| MUNSELL HUE CIRCLE | |
|---|---|
| HUE | SYMBOL |
| Red | R |
| Yellow-Red | YR |
| Yellow | Y |
| Green-Yellow | GY |
| Green | G |
| Blue-Green | BG |
| Blue | B |
| Purple-Blue | PB |
| Purple | P |
| Red-Purple | RP |

| MANNINGTON YARN COLOR CATEGORIES | |
|---|---|
| Light Red | LT - R |
| Light Yellow | LT - Y |
| Light Blue | LT - B |
| Light Space Dye | LT - SD |
| Dark Red | DK - R |
| Dark Yellow | DK - Y |
| Dark Blue | DK - B |
| Dark Space Dye | DK - SD |
| Not Applicable | N/A |

CARPET USING UNUSED YARN

This application claims the benefit under 35 U.S.C. §119 (e) of prior U.S. Provisional Patent Application No. 60/454,553 filed Mar. 14, 2003, which is incorporated in its entirety by reference herein.

BACKGROUND OF THE INVENTION

The present invention relates to carpet, and more particularly relates preferably to the use of leftover yarn for carpets.

In the manufacturing of carpet, rolls or spools of yarn are used wherein the yarn is tufted into a primary backing to form the face of the carpet. Various colors and types of yarn are used to form the various patterns. However, with any manufacturing, there is waste yarn also known as unused yarn or leftover yarn. This typically is the yarn that is leftover on the spool which has not been tufted during a manufacturing run. Furthermore, this yarn typically is not of sufficient quantities to justify using it in another production run. Thus, typically the industry takes this yarn which is leftover and designates it as waste yarn which is sold for a significantly lower value. For instance, average original yarn can cost three dollars a pound whereas leftover waste yarn is sold for fifteen cents to twenty cents per pound thus resulting in a significant economic loss to the carpet manufacturer.

Another problem facing the carpet industry is that certain patterns or lots have to be maintained in significant inventory since many times a production run will not occur again at all or will not occur for some time in the future. When a product run is not done again or not run for some time, many times it is difficult to have the pattern match identically with the previous pattern since the identical colors of the virgin yarn used previously may not be commercially available at a later time or may simply have been altered slightly by a change in dyeing formulations and the like. Thus, many times a carpet manufacturer will maintain a large amount of the production run in case a customer needs additional carpet or replacement carpet due to damage or wear. However, keeping such backup inventory again results in high economic cost to the carpet manufacturing and a waste of storage space. In addition, no matter how much this back up inventory exists, there will come a time where the inventory will run out and the customer simply is informed that there is no suitable carpet to replace the previously sold carpet and thus the customer will have the problem of having carpets that look visually different.

Accordingly, there is a need in the industry to develop a carpet pattern and recipe that will permit a carpet manufacturer to make carpet at any time and yet will be visually acceptable to the carpet user or customer without resulting in the need to keep various lots of inventory.

Furthermore, there is a need in the carpet industry to make use of this waste yarn or unused or leftover yarn in order to avoid the serious devaluing of the yarn as described above.

SUMMARY OF THE PRESENT INVENTION

A feature of the present invention is to provide a universal recipe for a carpet product which will permit the use of different types of unused yarn which can even vary from lot to lot to create a product that is visually acceptable to the customer and which can be used to replace other previously made lots of carpet.

A further feature of the present invention is to make use of leftover or unused yarn in the manufacturing of carpet.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a carpet comprising a yarn pattern having a pattern 1 of [A-B-C-D] and a pattern 2 of [E-F-G-H], wherein yarns A-D of pattern 1 are in any order (within this pattern 1) and yarns E-H of pattern 2 are in any order (within this pattern 2) in the respective yarn pattern. These orders, once established, are preferably maintained throughout the overall carpet pattern. The various designations A-H represent the following:

A is a yarn with a color having a 6-10 on the Munsell value scale and a red hue;

B is a yarn with a color having a 6-10 on the Munsell value scale and a yellow hue;

C is a yarn with a color having a 6-10 on the Munsell value scale and a blue hue;

D is a yarn with a color having a 6-10 on the Munsell value scale and is a spaced dye yarn with a neutral color;

E is a yarn with a color having a 1-5 on the Munsell value scale and a red hue;

F is a yarn with a color having a 1-5 on the Munsell value scale and a yellow hue;

G is a yarn with a color having a 1-5 on the Munsell value scale and a blue hue;

H is a yarn with a color having a 1-5 on the Munsell value scale and is a spaced dye yarn with a neutral color.

In one embodiment, at least one of yarns A-H that are present in the carpet contains at least two different types of yarn falling into that particular category. Preferably, the yarn used in the yarn pattern to form a carpet contains at least some unused or leftover yarn and more preferably is 100% unused or leftover yarn.

The present invention further relates to a series of carpet tiles formed from the carpet having the yarn pattern described above.

The present invention further relates to a method to use unused or leftover yarn following the yarn pattern described above.

Also, the present invention relates to a method to form a carpet having a visually consistent appearance using different types of yarns and following the yarn pattern described above.

It is to be understood that both the foregoing general description and the following detailed description are exemplary and explanatory only and are intended to provide a further explanation of the present invention, as claimed.

The accompanying drawings, which are incorporated and constitute a part of the present application, show aspects of the present invention and together with the description serves to explain one or more principals of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PRESENT INVENTION

Figure 1A:
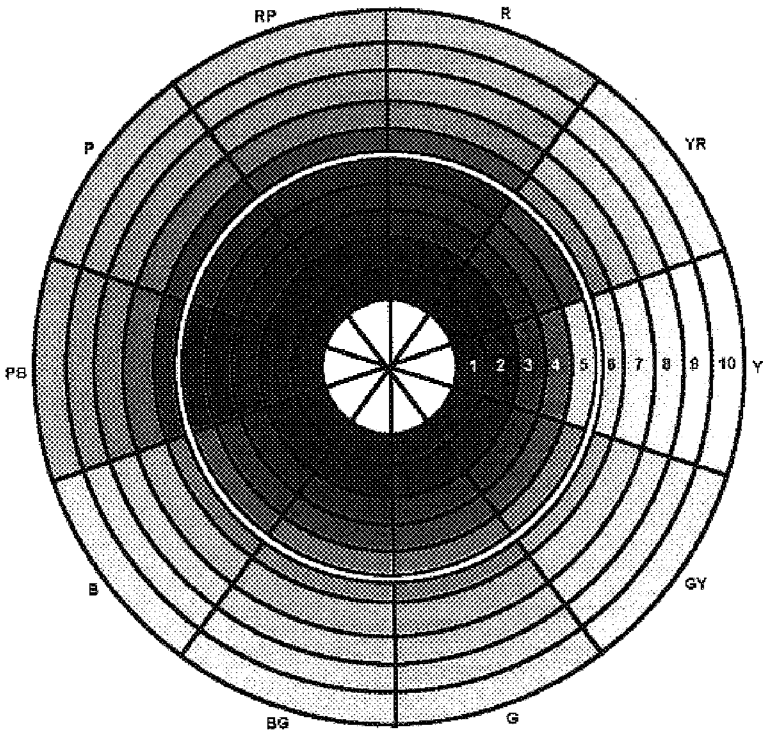
FIG. 1A is a Munsell hue circle with value scale.
Figure 1A:
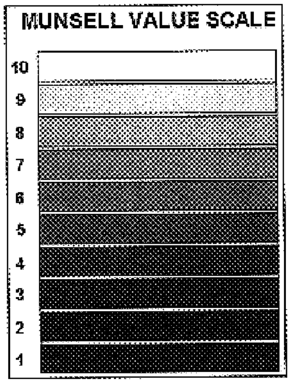

The present invention relates to a carpet that has a yarn pattern such that different lots of yarn even with differing colors can be used interchangeably and yet achieve a carpet having a visually consistent appearance. In other words, even though different types of yarn, which may even have different colors, are interchangeably used, the carpet formed has the appearance of looking substantially visually the same as the carpet being made from different types of yarn. Preferably, the carpet has a random combination of yarns as explained below, wherein in one embodiment, no two carpets (e.g., tiles) are alike.

In more detail, the present invention, in part, relates to a carpet having a yarn pattern having a pattern 1 of (A-B-C-D) and a pattern 2 of (E-F-G-H). Each of these letters signify at least one yarn having a certain color and value with respect to light or dark. Yarn A-D of pattern 1 can be in any order and yarn E-H of pattern 2 can be in any order. Both pattern 1 and pattern 2 combined are part of the overall carpet pattern. Pattern 1 can be before pattern 2 or vice versa. In other words, the yarn colors that make up the pattern for pattern 1 can be in any order and the yarn colors that make up the pattern for pattern 2 can be in any order, but pattern 2 follows pattern 1 or pattern 1 follows pattern 2. It is preferred that once an order is selected in forming the yarn pattern this yarn pattern is maintained throughout the formation of the yarn pattern in the carpet. For instance, if the order is A-D and E-H, then this pattern can be maintained (i.e., repeated) for purposes of the formation of that particular carpet design. However, any order is possible such as B-A-D-C, or C-D-A-B, and so on. Similarly, any order can be used for E-H. Furthermore, pattern 2 can precede pattern 1 or vice versa. Again, once the pattern order is selected, this pattern order can be maintained (e.g., repeated) in forming the carpet. An example of an overall pattern is A-B-C-D-E-F-G-H, or B-A-C-D-F-G-H-E, or C-A-B-D-H-E-G-F or F-G-H-E-A-B-C-D and any other combination of letters. The reference to the pattern made with A-H is meant to explain the tufting or stitching order which is preferably repeated throughout the production run. In repeating the pattern, different yarns for any one or more of yarns A-H can be used at any point in the overall pattern. For instance, two or more different yarns A can be used in the same pattern, different yarns B can be used anywhere in the same pattern, and so on. Thus, the pattern can contain a yarn A with a color having a 6 on the Munsell value scale and a red hue and in the same carpet, another yarn A (from a different lot) can be part of the same carpet, e.g., with a color having a 8 on the Munsell value scale and a red hue, and so on.

For purposes of the present invention, yarn A is a yarn with a color having a 6-10 on the Munsell value scale and a red hue.

Yarn B is a yarn with a color having a 6-10 on the Munsell value scale and a yellow hue.

Yarn C is a yarn with a color having a 6-10 on the Munsell value scale and a blue hue.

Yarn D is a yarn with a color having a 6-10 on the Munsell value scale and is a spaced dye yarn with a neutral color.

Yarn E is a yarn with a color having a 1-5 on the Munsell value scale and a red hue.

Yarn F is a yarn with a color having a 1-5 on the Munsell value scale and a yellow hue.

Yarn G is a yarn with a color having a 1-5 on the Munsell value scale and a blue hue.

Yarn H is a yarn with a color having a 1-5 on the Munsell value scale and is a spaced dye yarn with a neutral color.

It is to be understood that the phrase "neutral colors" is defined as black, white, and the grays between them and it is further understood that they have no hue. Furthermore, the reference to the Munsell value scale is a known numerical system to depict the light and darkness of colors or light and darkness of neutral colors. This value scale is also sometimes referred to as the Gray value scale. Thus, when reference is made to the Munsell value scale, it is understood that the numerical number assigned to the yarns is the numerical scale used in the Munsell value scale. However, any known method of color classification can be used. Some exemplary color classification methods are Munsell method, L.a.b. method, and grayscale method. For purposes of present invention and for illustration purposes only, the present invention refers to Munsell method of color classification; however, other methods of color classification can alternatively or also be used.

For purposes of the present invention, reference to red hue includes red (R), yellow-red (YR), and red-purple (RP) as those terms are understood using the Munsell hue circle as shown in FIG. 1A. Also, for purposes of the present invention the color yellow as used in the present invention for yarn B includes the colors yellow (Y), green-yellow (GY) and green (G) as those terms are understood using the Munsell hue circle. Also, yarn C as used in the present application which depicts blue includes blue (B), blue-green (BG) purple-blue (PB) and purple (P) as those terms are understood using the Munsell hue circle. Reference to the spaced dye for purposes of the present invention refers to yarn having, as indicated above, a neutral color ranging from white to black and the grays in between, wherein white is considered to have a value of 10 on the Munsell value scale and black has a value of 1 on the same value scale. The yarns A-H can have any chroma, and preferably are not fluorescent. The chroma can be high or weak for each respective color as that term is understood in the art. Typically, the chroma is 20 or lower on the Munsell chroma scale.

The length (e.g., the height of the pattern) of each pattern (e.g., pattern 1 and pattern 2) can be any length. For instance, with respect to a carpet tile that is 18"×18", the height (or length) of the pattern can be the entire length of the carpet tile. In the alternative, the length of the pattern can be any other size less than the entire length of the carpet tile. For instance, the length of the pattern can be ¼", ½", 1", ½", 1", 1½", 2", 3", 4", 5", and so on continuing up to the length of the carpet tile or other carpet substrate. Thus, when, for instance, the pattern has a length of 2" (or any other length), the pattern will generally go left to right in the pattern 1 and pattern 2 (or vice versa) as discussed above with a length of 2". Then, the pattern will begin again going left to right with a length of 2" and so on. It is important to note that the repeating of the pattern length every 2" does not have to match the pattern above or below it. In other words, the pattern can be aligned differently so as to provide a unique visual appearance. In addition, when the pattern is repeated, the pattern 1 and pattern 2 can be the same chosen order or can be a different order. FIGS. 3-6 show how this length of pattern can be alternated in order to provide different appearance.

Figure 3:
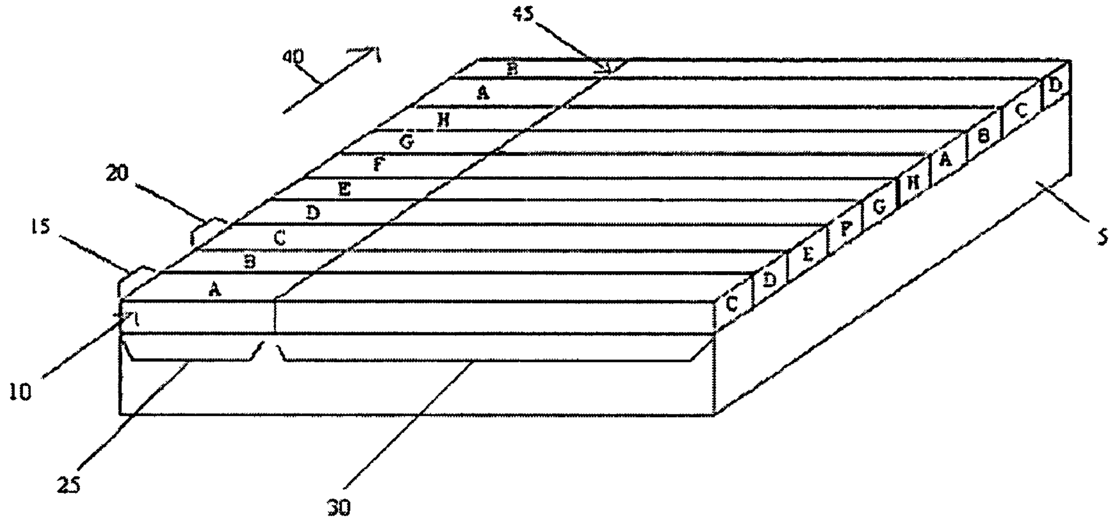
FIGS. 3-6 are schematic drawings depicting various embodiments of a carpet tile having a certain pattern based on the present invention.
Figure 4:
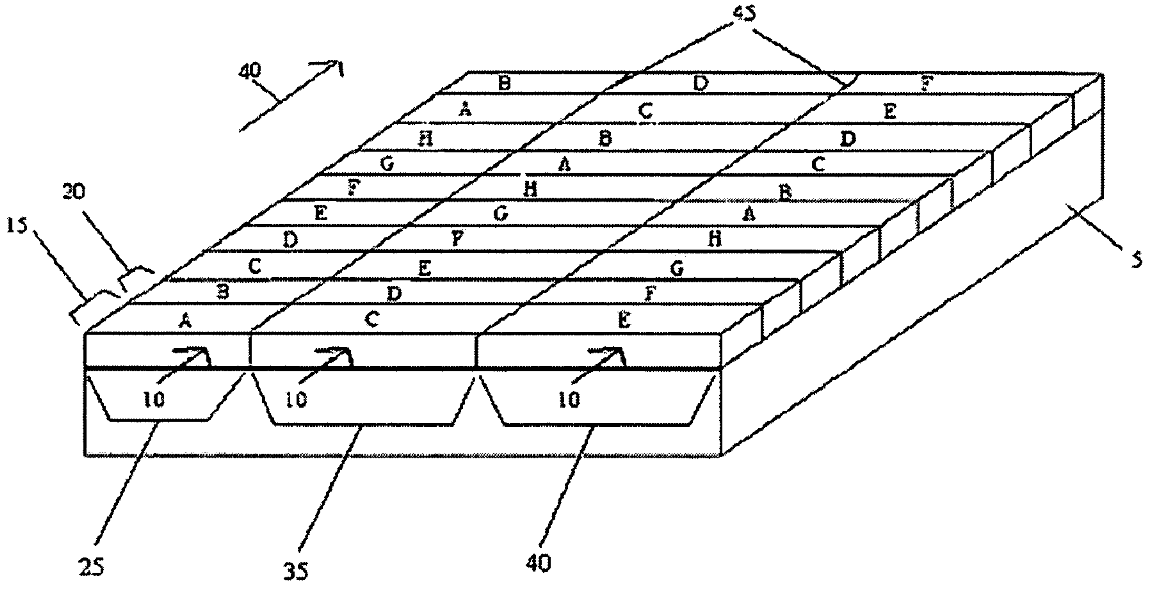
Figure 5:
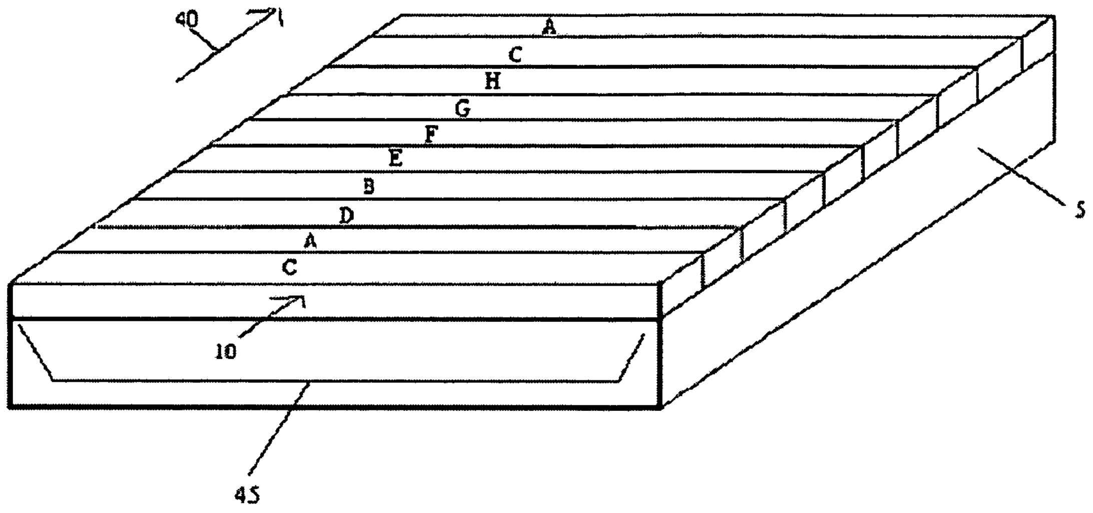
Figure 6:
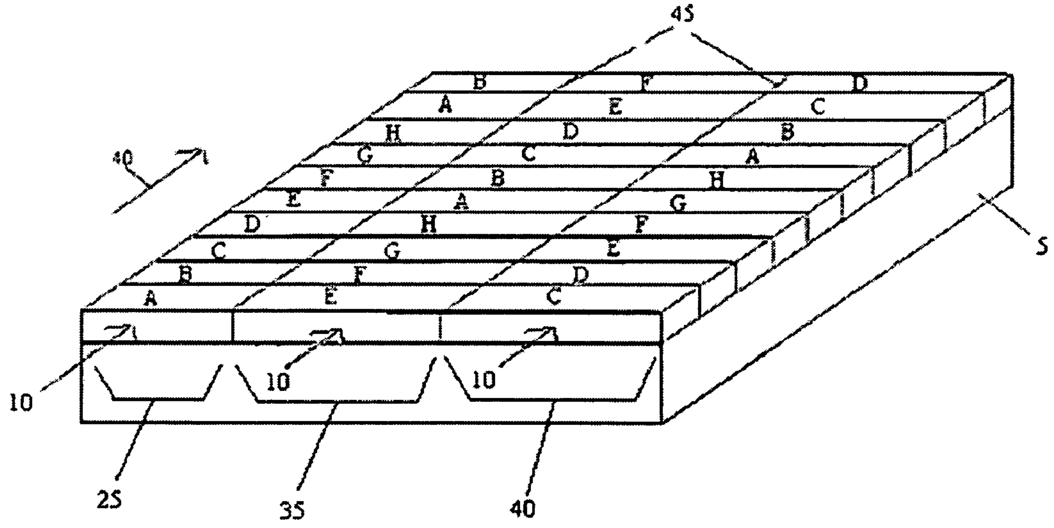

In more detail, and referring to FIG. 3, FIG. 3 represents an exploded view of a modular tile of the present application. The letters on the tile as shown in the Figure signify the placement or tufting of yarns A-H as defined herein in an exemplary pattern. For instance, numeral 10 as set forth in FIG. 3 represents one type of yarn which satisfies the category yarn A as defined herein. The yarns are tufted into a substrate 5, which can be any conventional type of substrate or multiple layers of substrates or other layers typically beginning with a primary backing. When yarn A as shown in FIG. 3 is tufted into the substrate 5, the width of yarn A can be a single stitch or it can be multiple stitches of yarn A to signify the width indicated by numeral 15. Typically, the width of each yarn tufted into the substrate is a single stitch but can be multiple stitches. The width of each yarn from the pattern tufted in the substitute can be the same or different. For instance, the width of yarn A (15) can be one or multiple stitches and the width of yarn C designated as (20) in FIG. 3 can be the same or different width. Furthermore, as described herein, the length of the pattern is shown by numeral 25 wherein this pattern goes in the direction of numeral 40. FIG. 3 is an example of a ⅓ and ⅔ pattern wherein numeral 45 designates the shifting of the pattern to create this appearance. As can be seen in FIG. 3, the pattern begins with yarn A for ⅓ of the pattern length having the length shown as numeral 25 and then the pattern for the remaining ⅔ of the tile, shown as numeral 30, begins with a different yarn category (i.e., different yarn letter) but maintaining the same overall pattern. Thus, a shifting of the pattern preferably occurs in order to provide a different appearance for the ⅓ and ⅔ pattern. When the pattern picks up again as shown in numeral 30, either the next yarn to follow in the pattern can be used, or any other yarn in the pattern can be used as long as the pattern is maintained and repeated. As shown in FIG. 3, the pattern picks up with the next yarn which is yarn C and continues in its pattern and repeats accordingly. In FIG. 4, a ⅓, ⅓, ⅓ pattern is shown wherein the same numerals signify and/or mean the same description as shown in FIG. 3. Numeral 35 signifies the length of the second ⅓ of the tile and numeral 40 signifies the length of the last ⅓ of the tile. FIG. 5 represents a tile wherein the entire length of the tile 45 is the length of the pattern. FIG. 6 represents a similar tile as FIG. 4 wherein the second ⅓ of the tile begins with a shifting of the pattern and instead of beginning with the next yarn category in the pattern, which would be yarn C for the second ⅓ designated as numeral 35, the pattern begins with yarn E and continues with the established pattern. Furthermore, for the last ⅓ of the tile, the pattern again shifts wherein yarn C begins the tile but uses the same established pattern. In addition, any design can be included in the carpet. For instance, shapes can be incorporated into the carpet tile using conventional tufting technology and wherein the shape and/or backdrop or background have the pattern of the present invention.

Figure 2:
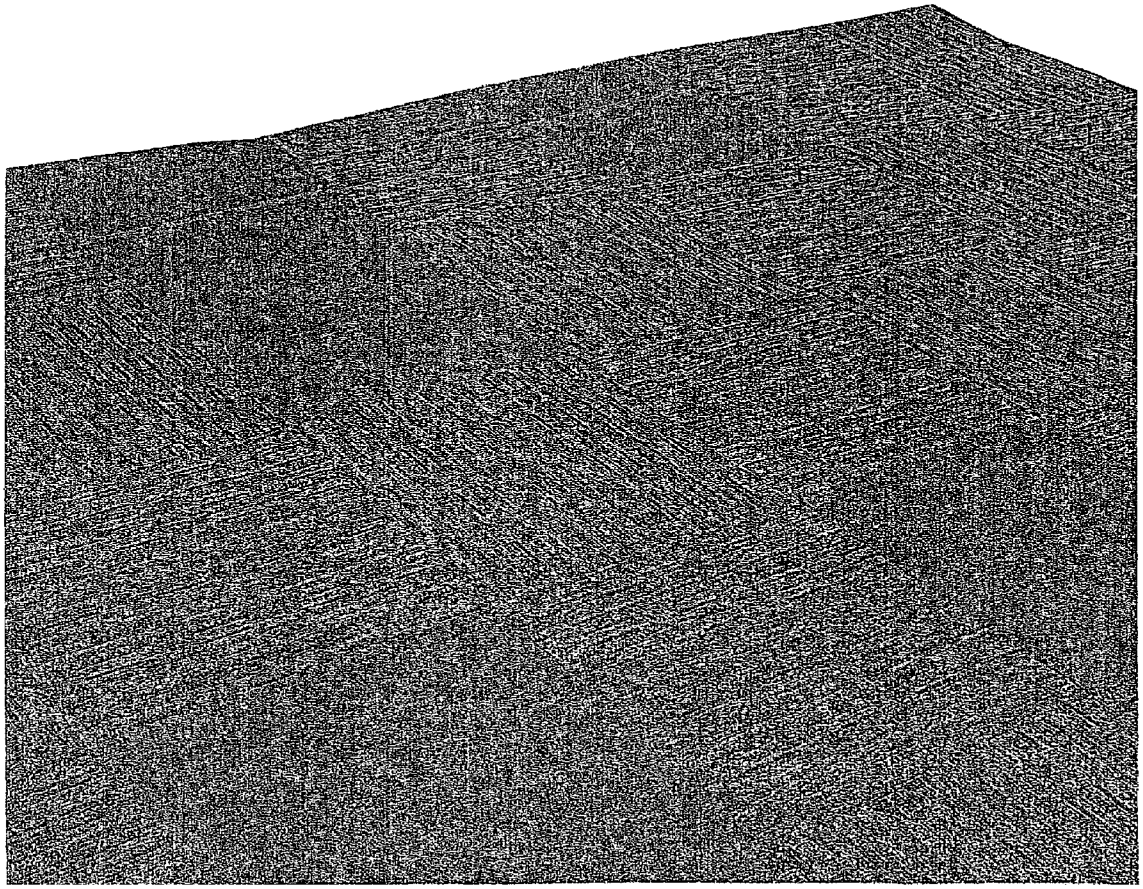
FIG. 2 is a drawing of various carpet tiles of the present application set forth in the particular configuration along with solid block tiles.

Furthermore, neutral carpet tiles having solid colors can be randomly or orderly placed amongst the series of carpet tiles of the present invention to provide unique accents in the carpet as shown in, for instance, FIG. 2.

For purposes of the present invention, the carpet of the present invention can be in any form or shape. For instance, the carpet can be a carpet tile of any dimensions, 6 ft. wide, 12 ft. wide, broadloom carpet, woven carpet, wall to wall and the like. Essentially, any type of carpet can be formed. The carpet can also be considered a textile substrate. Also the yarn used to form the carpet can be considered textile fibers. The yarn or textile fibers define a fibrous face, a primary backing to which the textile fibers are secured, and a secondary backing secured to the primary backing. For purposes of the present invention, the term “textile substrate” relates to, but is not limited to, a fiber, web, yarn, thread, sliver, woven fabric, knitted fabric, non-woven fabric, upholstery fabric, tufted carpet, and piled carpet formed, from natural and/or synthetic fibers. The yarn or fibers can be natural or synthetic, can be any length and have any size, and can be any brand or type used to form carpets.

The yarn of the present invention can be assembled into a fabric by any known assembly method. For example, the yarn can be bonded, woven, or can be assembled into the fabric by any other method.

The yarn can be any type of yarn. For example, the yarn can be filament nylon that can be a single yarn, twisted yarn, air entangled yarn, twist reversible yarn, or a combination thereof. Other examples of yarn that can be used are wool, polyester, polypropylene, nylon spun yarn, or a combination thereof.

Any type of backing can be used in the present invention. For example, broadloom backings, SBR latex, VAE, are among some types of backing that can be used in the present invention.

Figure 1B:
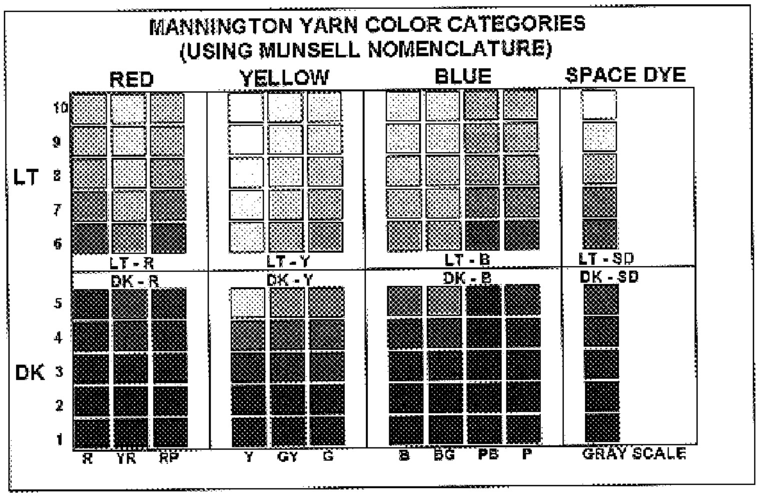
FIG. 1B is a chart showing the color categories using Munsell nomenclature.

FIG. 1B sets forth a chart showing the various colors which are classified together for purposes of the present invention.

In one embodiment of the present invention, at least one of the yarns A-H that is present in the carpet is from at least two different types of yarns. In other words, different lots and/or different colors within the category for that yarn can be used. As a specific example, a carpet can be made having a certain yarn pattern wherein yarn A contains a yarn having a red color with a Munsell value of 7 and then later on in the same yarn pattern, yarn A is red-purple with the same Munsell value scale or a Munsell value scale anywhere between 6-10. This would be true for any of the yarns. Thus, the benefit of this recipe is to permit one to use a host of different yarns to create a yarn pattern that still creates a pattern that is visually consistent even with the different types of yarns used. This is especially beneficial when leftover or waste yarn is present since many times there is not enough yarn leftover to create a whole production run. Thus, the present invention permits one to use a combination of various leftover or waste yarns as long as the yarn satisfies one of the yarn categories A-H. Certainly, any number of yarns A-H present in the pattern can contain at least two different types of yarns that satisfy each respective category.

Thus, the present invention provides a method and means to use unused or leftover yarn following the above-identified described yarn pattern. Furthermore, the present invention permits one to form carpets having a visually consistent appearance using unused or leftover yarn and wherein the yarn pattern contains different types of yarn.

With respect to the other variables typically present in a yarn pattern, the stitch rate per inch, the pile height, the weight, the type of primary backing, the pattern/shift, the secondary backing, and any other layers used to form a carpet are not critical to the present invention. Any of these variables can be selected in forming the carpet of the present invention and these various variables are conventionally known by those skilled in the art.

Any stitch rate can be used in the present invention, using any types of machines, such as a tufting machine. For example, the present invention can be tufted on a 1/10" gauge tufting machine, but can also be tufted on other gauge machines, such as from about ½" to about 1/20" gauge machines. Preferably, the stitch rate on the 1/10" gauge construction is about 11 stitches per inch, but can also range from about 5 stitches to about 20 stitches or higher per inch. Preferably, the carpet of the present invention is a carpet tile and more preferably an 18"×18" modular tile. The face of the carpet can be tufted, bonded, or woven, can be cut pile or looped, and the like.

Figure 7:
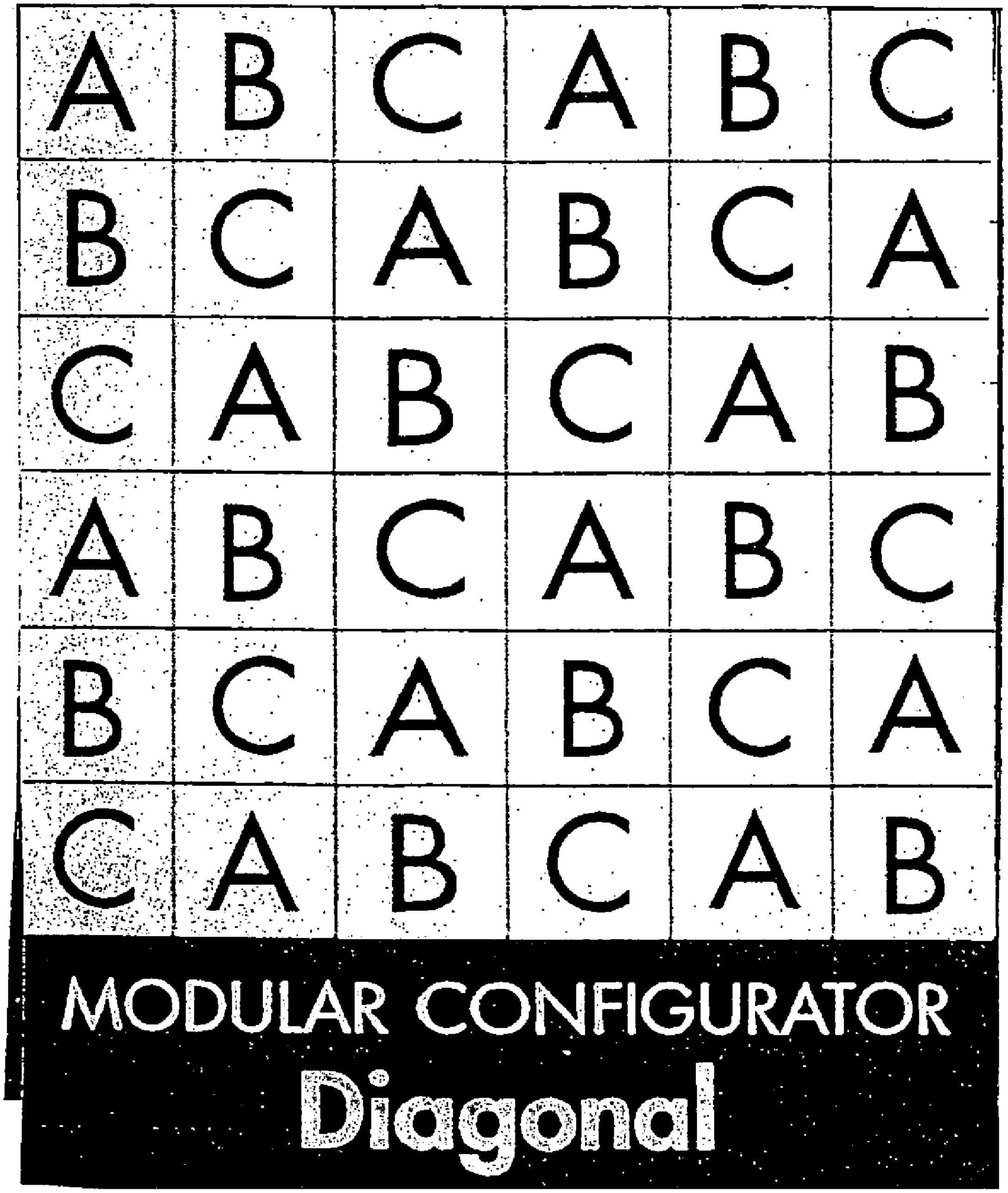
FIGS. 7-10 are schematic drawings showing various examples of various carpet tile configurations that can be used in the present invention.
Figure 8:
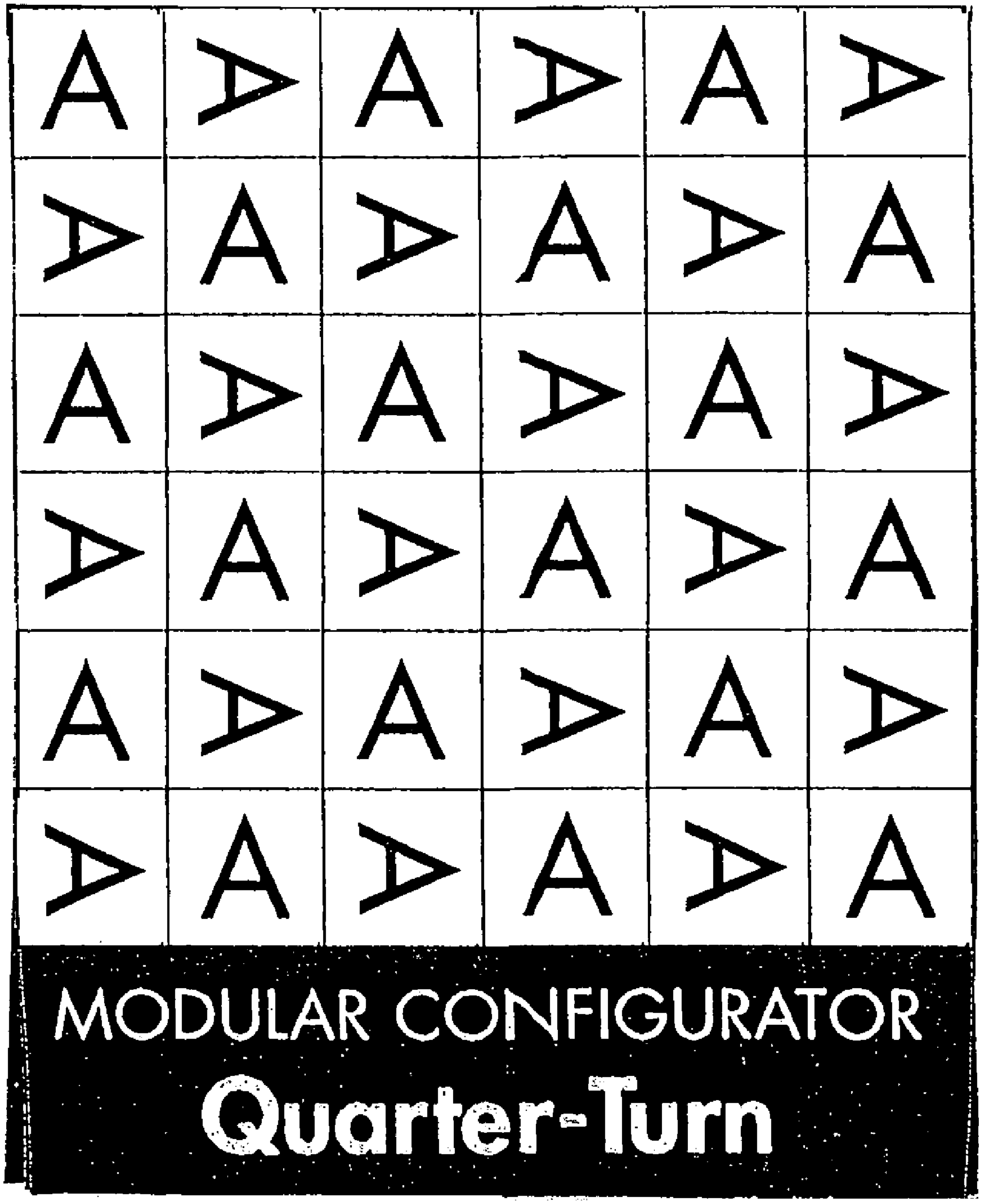
Figure 9:
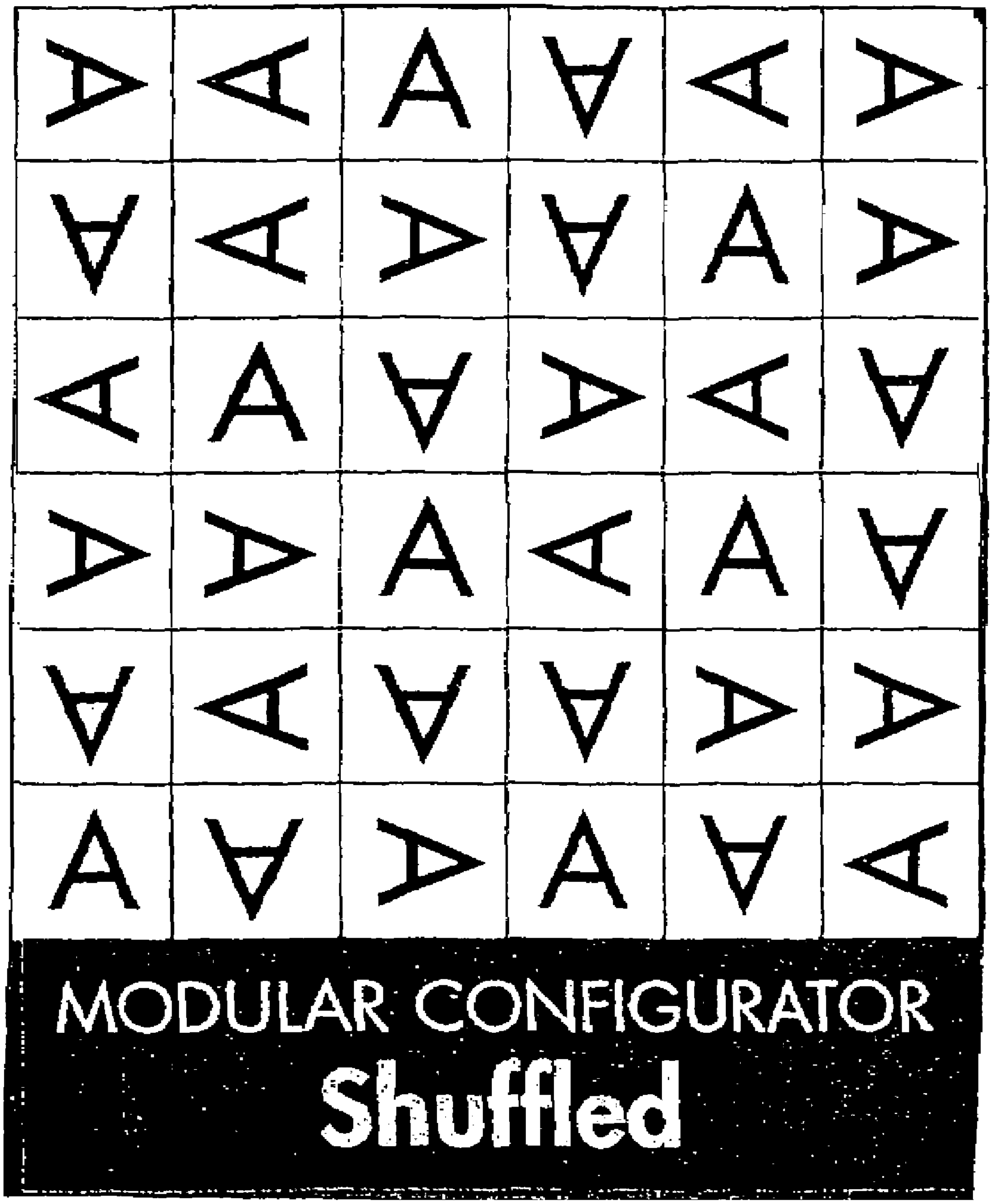
Figure 10:
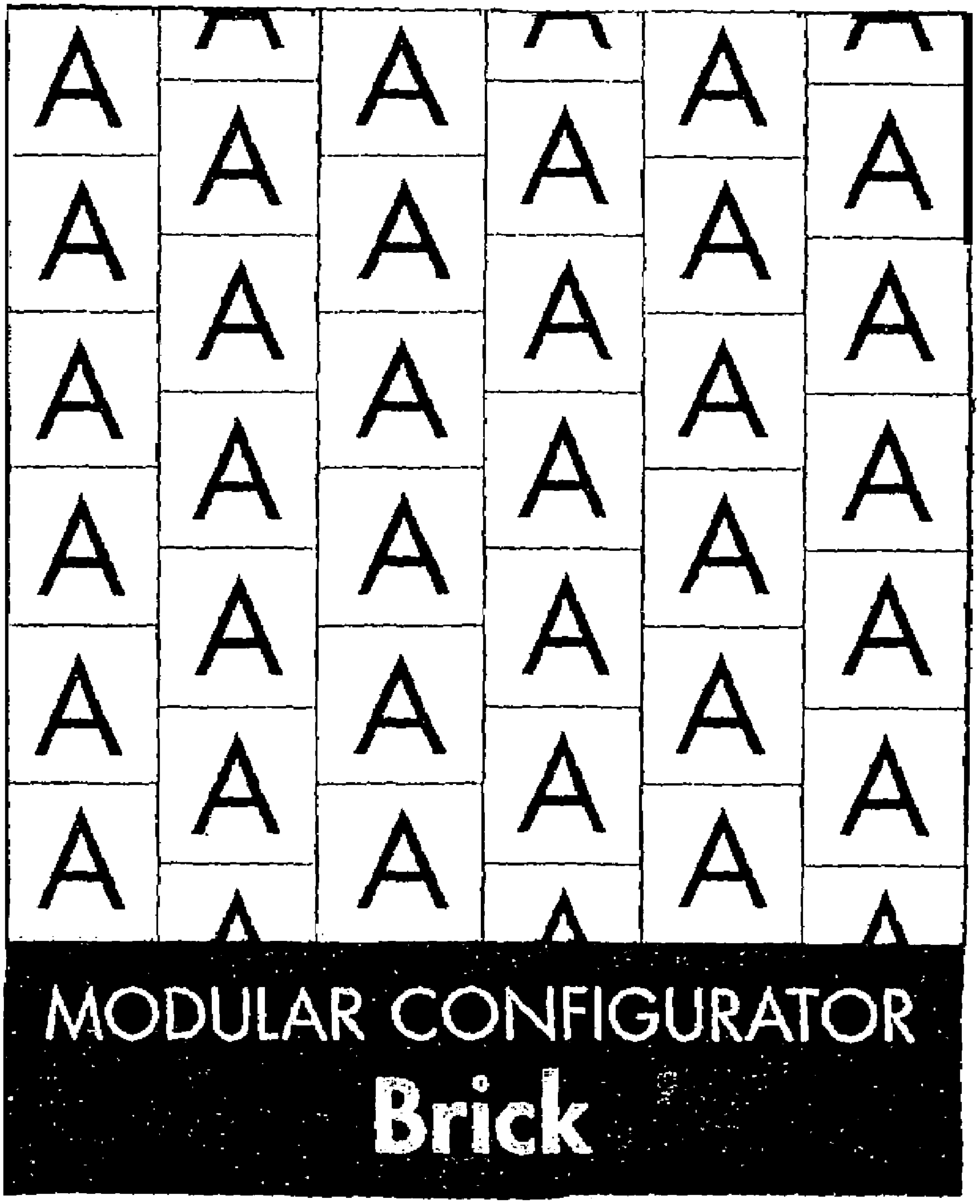

As indicated earlier, the present invention permits a carpet manufacturer to avoid keeping lots of finished carpet for inventory and furthermore, permits customers who buy from the yarn patterns of the present invention to use additional carpet at any time that meets this yarn pattern for replacement purposes or expansion purposes. Thus, a user of the present invention can simply contact the carpet manufacturer and obtain carpet that has a visually consistent appearance at a later time and not be concerned with out of stock or out of inventory concerns since at any time additional carpet can be made following this yarn pattern recipe and even though different yarns may be used to make the recipe as long as the categories are satisfied as described earlier, a carpet pattern will be formed that will provide a visually consistent appearance such that the user will accept the product as a match or substantial match to the previous yarn pattern used. When modular carpet tiles are formed using the present invention, the carpet tiles can be a ¼-turn modular installation or any other form of standard installation used for carpet tiles. In more detail, FIG. 7 is an example of modular tiles laid next to each other wherein each letter signifies one tile. The different letters signify different tiles. For instance, tile A can be the ⅓-⅔ pattern set forth in FIG. 3 wherein tile B can be the ⅓-⅓-⅓ pattern of FIG. 4 and tile C can be the tile of FIG. 5. FIG. 7 sets forth one possible configuration using different types of tiles as described above to present a unique appearance. Similarly, FIG. 8 is an example of a ¼-turn installation wherein the same type of tile, for instance the tile of FIG. 5 can be used in the installation using the ¼-turn configuration shown. FIG. 9 is another example of a configuration that can be used which is a shuffled configuration using the same tile but turning the tile in different directions as indicated. FIG. 10 is an example of another configuration which is identified as a brick configuration. Again, the same type of tile can be used but is shifted with respect to its installation as shown in FIG. 10. Needless to say, any type of configuration using the same type or different types of tiles can be used to create a variety of appearances.

The carpet that contains the yarn pattern of the present invention can have any conventional construction and typically includes at least a primary backing that permits the tufting or bonding of the yarns into a pattern. The carpet can also include a secondary backing, a pre-coat layer located beneath the primary backing, and any number of intermediate layers, wherein the intermediate layers can include reinforcement or stabilizer layers such as fiberglass layers or other polymer layers such as PVC, polyurethane, polystyrene, foam layers, and the like. The foam layers can be any type of foam layer such as a foamed polyurethane layer, a polyvinylchloride foam layer, and the like. The carpet can be cushion backed or hard back. The materials used for each layer can be any conventional materials for instance as described in U.S. Pat. Nos. 6,497,936; 6,316,075; 6,397,544; 6,413,632; 5,545,276; 6,203,881; 5,204,155; 5,198,277; 6,089,007; 5,683,780; 5,030,497; 4,680,209; 4,629,642; 4,522,857; 4,347,273; 3,968,709; and 4,437,918, all incorporated in their entirety by reference herein. These patents also describe other aspects that can be used in the present invention. The carpet can also have an adhesive on the back of the carpet, such as a peel and stick carpet tile, for instance, using releasable adhesive. In forming the carpet and each layer, conventional methods of tufting the yarn using a tufting machine can be used.

In another embodiment of the present invention, a carpet can be formed using a yarn pattern having a pattern 1 which has at least three yarns in the pattern selected from yarns A-D and also having a pattern 2 which has at least three yarns in the pattern selected from E-H. Pattern 1 can be in any order and pattern 2 can be in any order to establish the overall pattern of (pattern 1-pattern 2) and preferably once the orders are established, they are maintained throughout the manufacturing of the carpet. Yarns A-H have the same meaning as described earlier. In this embodiment, instead of eight different yarn categories, a carpet can be formed using a minimum of six yarn categories, seven yarn categories, or the eight yarn categories as described earlier. Thus, pattern 1 can have yarn A, B, and C or a pattern B, C, D, or a pattern C, A, B, and so on. Similarly, pattern 2 can be any of three of the four categories such as E, F, G, or F, G, H, or H, E, F, and so on.

As indicated above, in making the yarn pattern of the present invention, any standard yarn tufting or yarn bonding apparatus can be used. When the unused or leftover yarn is not of substantial quantity, the various yarns that satisfy one of the categories can be spliced together to make a large spool of yarn to be used for that designated category.

Thus, the present invention provides a unique and cost saving carpet and further solves many problems with respect to inventory and keeping lots of the carpet.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A carpet tile comprising a yarn pattern having a pattern 1 of [A-B-C-D] and a pattern 2 of [E-F-G-H], wherein yarn A-D of pattern 1 is in any order and yarn E-H of pattern 2 is in any order, and said orders, once established, are maintained throughout said carpet tile, and wherein A is a yarn with a color having a 6-10 on the Munsell value scale and a red hue;

B is a yarn with a color having a 6-10 on the Munsell value scale and a yellow hue;

C is a yarn with a color having a 6-10 on the Munsell value scale and a blue hue;

D is a yarn with a color having a 6-10 on the Munsell value scale and is a spaced dye yarn with a neutral color;

E is a yarn with a color having a 1-5 on the Munsell value scale and a red hue;

F is a yarn with a color having a 1-5 on the Munsell value scale and a yellow hue;

G is a yarn with a color having a 1-5 on the Munsell value scale and a blue hue;

H is a yarn with a color having a 1-5 on the Munsell value scale and is a spaced dye yarn with a neutral color, and wherein at least two of yarns A-H differ by Munsell value scale number from at least two corresponding yarns A-H throughout the carpet tile; wherein the carpet tile is capable of being interchanged with carpet tiles from various lots in which said pattern 1 and pattern 2 are established; wherein said carpet tile produces a visually acceptable effect; and wherein said pattern 1 and pattern 2 are alternating throughout said carpet tile.

2. A series of carpet tiles comprising the carpet tile of claim 1.

3. The carpet tile of claim 1, wherein at least one of yarn A-H comprises leftover waste yarn.

4. The carpet tile of claim 1, wherein at least two of yarn A-H comprises leftover waste yarn.

5. The carpet tile of claim 1, wherein at least three of yarn A-H comprises leftover waste yarn.

6. The carpet tile of claim 1, wherein each of yarn A-H comprises leftover waste yarn.

7. The carpet tile of claim 1, wherein said pattern 1 is first used in said pattern and said pattern 2 is second and said pattern 1 and said pattern 2 are repeated in that order.

8. The carpet tile of claim 1, wherein said pattern 2 is first and said pattern 1 is second and this order of patterns is repeated.

9. The carpet tile of claim 1, wherein said carpet tile comprises a primary carpet layer having a pile side and an underside with a plurality of yarn projecting outwardly from said pile side.

10. The carpet tile of claim 9, wherein said carpet tile further comprises at least one secondary backing and at least one intermediate layer and at least one pre-coat layer wherein said pre-coat layer secures the yarns to said primary backing.

11. The carpet tile of claim 10, wherein said intermediate layer comprises at least one polymer layer or at least one reinforcement layer, or both.

12. The carpet tile of claim 9, wherein said carpet tile further comprises a foam cushion layer.

13. The carpet tile of claim 12, wherein said foam cushion layer comprises polyurethane.

14. The carpet tile of claim 10, wherein an adhesive is located on the back of the carpet tile.

15. The carpet tile of claim 1, wherein said yarn comprises nylon yarn, a wool yarn, a polyester yarn, or polypropylene yarn.

16. The carpet tile of claim 15, wherein said nylon yarn is a filament nylon yarn.

17. The carpet tile of claim 16, wherein said filament nylon yarn is a single yarn, a twisted yarn, an air entangled yarn, a twist reversible yarn, or a combination thereof.

18. The carpet tile of claim 1, wherein said carpet tile is tufted on a tufting machine having a gauge range of from about ½ inch to about 1/20 inch.

19. The carpet tile of claim 18, wherein said tufting machine has a gauge of about 1/10" and includes a stitch rate of from about 5 stitches to about 20 stitches per inch.

20. A carpet tile comprising a yarn pattern having pattern 1 having at least three yarns selected from yarn A through yarn D and having pattern 2 having at least three yarns selected from yarn E through yarn H, wherein pattern 1 is in any order and wherein pattern 2 is in any order and said orders, once established, are maintained throughout said carpet, and wherein A is a yarn with a color having a 6-10 on the Munsell value scale and a red hue;

B is a yarn with a color having a 6-10 on the Munsell value scale and a yellow hue;

C is a yarn with a color having a 6-10 on the Munsell value scale and a blue hue;

D is a yarn with a color having a 6-10 on the Munsell value scale and is a spaced dye yarn with a neutral color;

E is a yarn with a color having a 1-5 on the Munsell value scale and a red hue;

F is a yarn with a color having a 1-5 on the Munsell value scale and a yellow hue;

G is a yarn with a color having a 1-5 on the Munsell value scale and a blue hue;

H is a yarn with a color having a 1-5 on the Munsell value scale and is a spaced dye yarn with a neutral color, and wherein at least two of yarns A-H differ by Munsell value scale number from at least two corresponding yarns A-H throughout the carpet tile; wherein the carpet tile is capable of being interchanged with carpet tiles from various lots in which said pattern 1 and pattern 2 are established; wherein said carpet tile produces a visually acceptable effect; and wherein said pattern 1 and pattern 2 are alternating throughout said carpet tile.

21. The carpet tile of claim 20, wherein at least one of yarn A-H comprises leftover waste yarn.

22. The carpet tile of claim 20, wherein said pattern 1 is A, B, and C and said pattern 2 is E, F, and G.

23. The carpet tile of claim 20, wherein said pattern 1 is B, C, and D and said pattern 2 is F, G, and H.

24. The carpet tile of claim 20, wherein said pattern 1 is C, A, and B and said pattern 2 is H, E, and F.

25. The carpet tile of claim 20, wherein said yarn comprises nylon, wool, polyester, or polypropylene.

26. The carpet tile of claim 25, wherein said nylon is a filament nylon.

27. The carpet tile of claim 26, wherein said filament nylon is a single yarn, a twisted yarn, an air entangled yarn, a twist reversible yarn, or a combination thereof.

28. The carpet tile of claim 20, wherein said carpet tile is tufted on a tufting machine having a gauge range of from about ½ inch to about 1/20 inch.

29. The carpet tile of claim 28, wherein said tufting machine has a gauge of about 1/10 and includes a stitch rate of from about 5 stitches to about 20 stitches per inch.

* * * * *